(12) United States Patent
Fandella

(10) Patent No.: US 7,121,400 B2
(45) Date of Patent: Oct. 17, 2006

(54) SYSTEMS AND METHODS FOR GUIDING CONVEYANCE ELEMENTS

(75) Inventor: Sergio Fandella, Mogliano Veneto (IT)

(73) Assignee: Plastomeccanica S.p.A., Vittorio Veneto (IT)

( * ) Notice: Subject to any disclaimer, the term of this patent is extended or adjusted under 35 U.S.C. 154(b) by 0 days.

(21) Appl. No.: 11/154,703

(22) Filed: Jun. 17, 2005

(65) Prior Publication Data
US 2006/0081448 A1    Apr. 20, 2006

(30) Foreign Application Priority Data
Oct. 18, 2004   (IT)   ............. TV2004A0115

(51) Int. Cl.
*B65G 35/00*    (2006.01)
(52) U.S. Cl. .................... 198/619; 198/805
(58) Field of Classification Search ............. 198/619, 198/805
See application file for complete search history.

(56) References Cited

U.S. PATENT DOCUMENTS

| | | | | |
|---|---|---|---|---|
| 2,609,915 A | * | 9/1952 | De Burgh | 198/619 |
| 2,824,638 A | * | 2/1958 | De Burgh | 198/619 |
| 3,731,166 A | * | 5/1973 | Inuzuka et al. | 318/35 |
| 4,704,792 A | * | 11/1987 | Itagaki et al. | 29/741 |
| 4,742,906 A | * | 5/1988 | Wallaart | 198/805 |
| 4,801,003 A | * | 1/1989 | Costa | 198/802 |
| 4,823,939 A |   | 4/1989 | Langhans et al. | |
| 4,892,186 A | * | 1/1990 | Frei | 198/867.13 |
| 6,085,896 A | * | 7/2000 | van Zijderveld | 198/841 |
| 6,129,201 A | * | 10/2000 | Langhans | 198/805 |
| 6,155,406 A | * | 12/2000 | Garbagnati | 198/805 |
| 6,398,016 B1 | * | 6/2002 | Maeder et al. | 198/867.13 |
| 6,510,941 B1 | * | 1/2003 | Schermutzki et al. | 198/836.1 |
| 6,957,734 B1 | * | 10/2005 | Imai et al. | 198/472.1 |

FOREIGN PATENT DOCUMENTS

EP    0 509 605 A    10/1992

\* cited by examiner

*Primary Examiner*—Joe Dillon, Jr.
(74) *Attorney, Agent, or Firm*—Modiano & Associati; Albert Josif; Daniel O'Byrne

(57) ABSTRACT

Systems and methods for controlling the planarity of a conveyance element with respect to a guide while the conveyance element is in motion. This control is achieved by coupling a guide to a conveyance element where the conveyance element is held in a level position by a magnetic force. The attractive force specifically holds the edges of the conveyance element in place, so that they do not lift up or separate from the guide as the guide, by way of a chain coupling the guide to the conveyance element, carries the conveyance element through a defined path over a linear distance or around a corner in, for example, a manufacturing line environment.

19 Claims, 5 Drawing Sheets

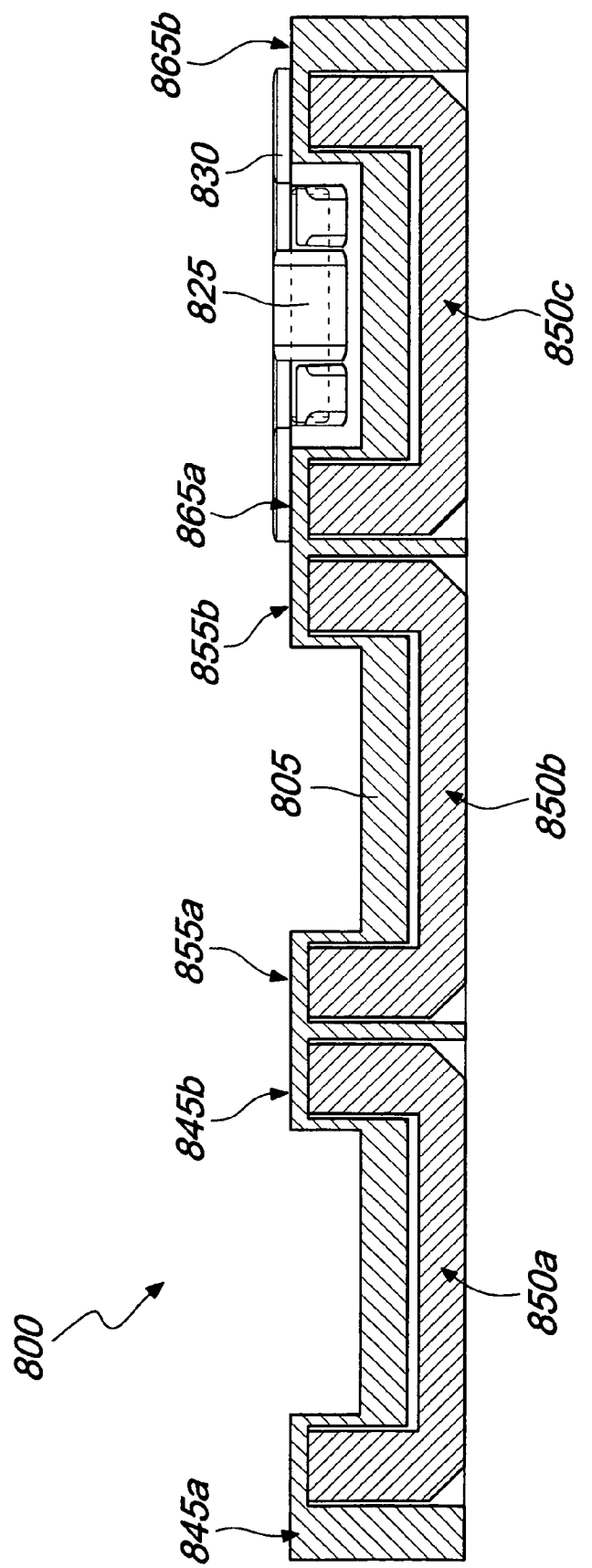

SYSTEMS AND METHODS FOR GUIDING CONVEYANCE ELEMENTS

CROSS-REFERENCE TO RELATED APPLICATIONS

This is based on and claims priority to and the benefits of U.S. patent application Ser. No. 11/000,965, filed Dec. 2, 2004 and Italian Patent Application TV2004A000115, filed Oct. 18, 2004. The entirety of both of these applications is hereby incorporated by reference.

FIELD OF THE INVENTION

The present invention relates to the development, creation, and use of a guide for controlling the movement of conveyance elements on an assembly line, and more particularly to controlling conveyance elements in a manufacturing or processing environment so that the conveyance elements remain level as they follow a path set out by the guide over a linear distance or around corners during, for example, high speed assembly line manufacturing.

BACKGROUND OF THE INVENTION

The design of suitable systems for moving articles from point A to point B, such as in an assembly line environment, is particularly important in the provision of industrial facilities for manufacturing or processing goods of various kinds. In many cases, these facilities require high production capacity, and these movement systems must be completely automated, highly efficient, and reliable, because any malfunction may halt the entire production. Naturally, the assembly of more complicated articles requires a longer or more complicated assembly line.

Due to limitations such as manufacturing plant size, the assembly line is often forced to follow a curved path around the interior of a building. At high speeds an assembly line may encounter a problem as it rounds a curve. A conveyor belt on the surface of an assembly line, upon which an article may be placed, may become uneven, as forces such as for example centrifugal forces, act on the surface of the conveyor belt and cause a portion of the conveyor belt to raise up from its support structure. The same problem may also occur over linear portions of an assembly line. For example a single edge, such as the inner edge or outer edge of the conveyor belt may lift from the surface of the assembly line so that the entire conveyor belt is no longer flush or level with the surface of the assembly line. In other words, a problem exists where the conveyor belt no longer lies flat on the assembly line as it rounds a corner at high speed, or as slack develops along a linear portion. This raising of the conveyor belt may for example cause a jamming of the assembly line, or may cause the items on the assembly line to fall off the conveyor belt or to shift into an unacceptable position, resulting in a shutting down of the assembly line, and costly repairs, or a delay in the items reaching their end destination. It also prevents the assembly line from operating at an increased speed.

Certain conveyor belts may be may be divided into sections in order to round corners. An example of this would be the conveyor belt at baggage claim terminal at an airport. In other instances, a barrier may be placed along the conveyor belt on the outer edge of the curve to prevent the items from flying off the conveyor belt. However, neither of these situations solves the aforementioned tilting or lifting of the conveyor belt in a high speed manufacturing line environment, both may result in damaging the items or the barrier itself, and neither does anything to prevent the items from shifting as a result of the tilt. The result is increased maintenance cost and reduced performance of the assembly line.

Another known situation involves using magnetic force in an effort to hold the conveyor belt to the assembly line where at least the assembly line and conveyor belt are made of a magnetic material. However, this situation requires that the conveyor belt be made of costly and heavy magnetic material and requires an inefficient lubrication system to ensure regular and smooth operation. Further, such a system may not be used if it is necessary to convey items that may be damaged by contact with metallic surfaces, and the magnets involved must be arranged so that their respective magnetic poles are oppositely orientated, thus increasing the chances of installation error, making it difficult to perform assembly and maintenance, and accordingly increasing the overall production and management costs of the conveyor belt.

Plastic assembly lines still have the shortcoming of oppositely oriented magnetic poles on adjacent magnets, and, importantly, since the attraction force is applied to the center or other single point of the conveyor belt, a level conveyor belt surface around a corner is still not ensured, since the lateral ends, (e.g., edges) of the loading surface still lift from the assembly line when proceeding through a curve at speed, even with the center or the conveyor belt subject to a magnetic field.

SUMMARY OF THE INVENTION

Thus, a need exists for a system and method capable of withstanding unwanted forces applied to a conveyance element in order to hold the conveyance elements in place, flush against the surface of an assembly line (thus preventing lifting in the center or along the edges of the conveyance element from the assembly line) as the assembly line travels linearly or rounds corners in a manufacturing or production environment.

In satisfaction of these needs, the present invention features an apparatus and methods for holding conveyance elements in place as they move in real time in an environment such as along an assembly line. To increase efficiency and reduce cost, portions of the apparatus and method, such as the conveyance element, may include polymers or polymer-metal blends. This improves reliability, efficiency, and performance.

In accordance with one aspect of the invention, an apparatus is provided for controlling a conveyance element as it moves along a set path. This apparatus includes a guide defining a path. A chain is coupled to the conveyance element to carry the conveyance element along the path. The conveyance element has two edges corresponding to the two edges of the guide along which the conveyance element is moving. A first rail is also provided along one of the edges of the conveyance element, and thus also along one of the sides of the guide, and a magnetic field is generated that encompasses at least a portion of the apparatus. The magnetic force from the magnetic field holds the conveyance element level against the chain along the location of the conveyance element that is closest to the chain. Preferably, the chain is centered beneath the middle of the conveyance element, so this location is a strip of the conveyance element located directly above the chain. The magnetic field also holds the edge of the conveyance element level against the guide by applying an attractive force between the edge of the conveyance element and the appropriately configured first rail. Preferably, portions of the system may include polymers to reduce cost and weight, and to increase efficiency. In various embodiments, a second rail, also subject to the magnetic force, is provided. The second rail is located in a position along the second edge of the conveyance element, and thus also along one of the edges of the guide, so that the second rail holds the second edge of the conveyance element level against the guide when under the influence of the magnetic force.

In accordance with another aspect of the invention, a method is provided for controlling a conveyance element in real time by defining a path along which a guide and the conveyance element travels. Under this method, a chain is coupled to the guide and the conveyance element for moving the conveyance element along the guide, and a first rail is located a uniform distance from the edge of the conveyance element, and thus also along one of the edges of the guide. The method also generates a magnetic field that encompasses at least a portion of the elements defined by the method, such as the chain, the conveyance element, the guide and the first rail. Under this method, the magnetic field creates an attractive force between the chain and the conveyance element to hold the conveyance element level against the guide at the location nearest the chain. The magnetic field also creates an attractive force between the first rail and the edge of the conveyance element to force the edge of the conveyance element to remain level against the guide. In various embodiments, a second rail, also subject to the magnetic force, is provided. The second rail is located in a position along the second edge of the conveyance element, and thus also along one of the edges of the guide, so that the second rail holds the second edge of the conveyance element level against the guide when under the influence of the magnetic field. Preferably, the method allows many components to include polymers, so that only the portions of the chain, conveyance element, and rails required to hold the conveyance element level against the guide in the center and along the edges of the conveyance element include materials responsive to the magnetic force.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be readily apparent from the following description of various embodiments, when read together with the accompanying drawings, which are meant to illustrate and not limit the invention, and in which:

FIG. 8 is another alternate cross-sectional view of a portion of the apparatus capable of carrying out the method in accordance with an embodiment of the invention.

DETAILED DESCRIPTION OF THE PREFERRED EMBODIMENTS

Figure 1:
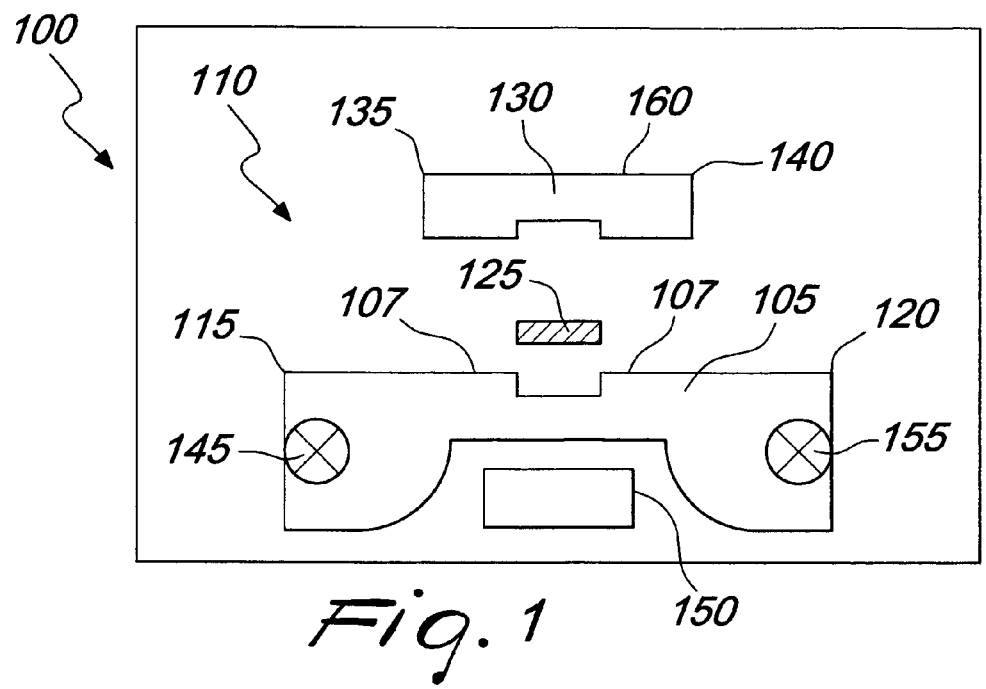
FIG. 1 is an exploded view of a cross section of the apparatus capable of carrying out the method in accordance with an embodiment of the invention.

As shown in the drawings for the purposes of illustration, the invention may be embodied in apparatuses and methods for real time production line process activity, where the apparatuses and methods compensate for a limited footprint and undesirable forces arising along bends or linear portions of the assembly line to enhance overall efficiency and performance.

In brief overview, FIG. 1 is an exploded cross-sectional block diagram that depicts an apparatus 100 for controlling an assembly line environment in accordance with an embodiment of the invention. The system 100 typically includes one or more guides 105. Various embodiments may include more than one guide 105. Generally, multiple guides may be located side by side relative to each other. Guide 105 may include any assembly structure that holds the assembly line in place in the desired position. In various embodiments guide 105 may be made of a polymer or polymers, metal, or any combination thereof. Typically guide 105 may be made of any material with good wear resistance characteristics and a low coefficient of friction with respect to other polymer or metallic materials. The shape of guide 105 is for illustrative purposes, and guide 105 may be any shape capable of supporting the structure and elements of the invention. Guide 105 generally includes a guide surface 107, which is generally the portion of the guide upon which other components or elements may be coupled to, placed upon, and to which they remain level. Guide surface 107 is typically level. For example, in an embodiment guide surface 107 is parallel to the level floor or support beneath apparatus 100.

Guide 105 is defined by a first guide edge 115 and a second guide edge 120. Guide edges 115 and 120 generally are the outer boundary of guide 105 and thus are the minimum requirements for the width of apparatus 100. Finally, guide 105 also defines a path 110. Path 110 is a volume of three dimensional space that the apparatus occupies. In an embodiment, path 110 includes the footprint or volume occupied by an assembly line as it winds around a factory floor, and typically path 110 is big enough to include all of guide 105, including guide edges 115 and 120.

In an embodiment, guide 105 is coupled to a chain 125. Chain 125 generally is on top of guide 105 relative to a floor and is capable of moving through path 110. Chain 125 typically drives apparatus 100 in its direction of motion. (Generally, there is a power source, (not shown) driving the chain. In an embodiment, chain 125 may be made of metal. In an alternate embodiment, chain 125 may be made out of a polymer-metal blend sensitive to magnetic fields. In an embodiment, chain 125 may be made out of about 50% polymer, about 30% iron oxide, and about 20% other metal fibers or powders. For example, chain 125 may include 40–60% polymers, 20–40% iron oxide, and 10–30% other metal fibers or powders. This incorporation of polymers into chain 125 reduces system 100 cost, wear, and weight. Further, a polymer-metal blend causes chain 125 to react to magnetic fields along its entire length. In various embodiments, the means for coupling conveyance element 130 to guide 105 may be any device capable of securing those two elements together such that at least one of them (conveyance element 130 or guide 105) is capable of being driven in the direction of motion of the coupling means. Further, various embodiments may include a plurality of chains coupled to a plurality of guides, and any chain 125 may be replaced by or supplemented with a cable, rope, pivots, bushings, or any other device capable of functioning in the same manner.

Apparatus 100 also includes at least one conveyance element 130. Conveyance element 130 is coupled to chain 125 so that chain 125, when in motion along an axis, drives conveyance element 130 along the same axis. In an embodiment, multiple conveyance elements 130 may collectively form a conveyor belt. Typically, in an embodiment with more than one conveyance element 130, each conveyance element 130 is coupled to the previous and next conveyance element by a pivot, (not shown). Generally, conveyance element 130 is a polygon. Conveyance elements 130 may be collectively shaped in any manner enabling them to round a corner while remaining level or flush with guide 105 when collectively driven by chain 125. Typically, conveyance element 130 is located between first guide edge 115 and second guide edge 120 and above guide 105. In an embodiment conveyance element 130 is physically resting on top of guide 105, on top of chain 125, or on top of both guide 105 and chain 125, and conveyance element 130 remains flush with guide 105, chain 125, or both guide 105 and chain 125 when in motion.

Conveyance element 130 also includes a first conveyance element edge 135 located on the same side of guide 105 as first guide edge 115. Further, conveyance element 130 includes a second conveyance element edge 140 located on the same side of guide 105 as second guide edge 120. Generally, all of conveyance element 130, including first conveyance element edge 135 and second conveyance element edge 140 are supported by guide 105 and driven in the direction of motion of chain 125. Generally, conveyance element 130 may be made out of metal, a polymer or polymers, or any polymer-metal blend that is sensitive to a magnetic field. In an embodiment, conveyance element 130 may be made out of about 50% polymer, about 30% iron oxide, and about 20% other metal fibers or powders. For example, conveyance element 130 may include 40–60% polymers, 20–40% iron oxide, and 10–30% other metal fibers or powders.

Apparatus 100 may also include at least one first rail 145. Generally, first rail 145 runs in path 110 inside or adjacent to first guide edge 115. In an embodiment, first rail 145 may run the entire length of guide 105. In an embodiment, first rail 145 may run along the length of a segment of guide 105. In an illustrative embodiment, first rail 145 may only appear during a curved segment of guide 105. In a typical embodiment, first rail 145 is integrated with, or part of, first guide edge 135. First rail 145 is depicted in FIG. 1 as having a round cross section, however in an embodiment, first rail 145 may have a rectangular cross section, and in various embodiments, first rail 145 may have a cross section of any shape. In an embodiment, first rail 145 may be surrounded by guide 105, or located within guide 105 as part of first guide edge 115. In an embodiment, first rail 145 may support guide 105. First rail 145 may include metals, polymers, or a blend thereof. In an embodiment, first rail 145 may be included within first guide edge 115. In other words, in an embodiment, first guide edge 115 may also be first rail 145.

Apparatus 100 also includes at least one magnetic field generator 150. Typically, magnetic field generator 150 is a device or object capable of generating, or having, a magnetic field. For example magnetic field generator 150 may be a magnet. This magnet for example may include a permanent magnet or an electromagnet. In an embodiment, the magnet may be situated in a receptacle (not shown) formed complementary to guide 105. In the illustrated embodiment magnetic field generator 150 is located beneath guide 105, however the precise location and shape of magnetic field generator 150 may vary. In various embodiments, magnetic field generator may be located beneath, within, or to one side of guide 105, and may be bigger, smaller, or the same size as guide 105. Magnetic field generator 150 may also be located adjacent to, or within first rail 145 or a second rail 155. In an embodiment, magnetic field generator 150 may include a magnet having a U-shaped cross section. In an embodiment, multiple magnetic field generators 150 may be located at various points in any of the above mentioned locations along portions of guide 105, such as for example along first rail 145 when guide 105 rounds a corner. In an embodiment, magnetic field generator 150 may include a plurality of individual magnets spaced from each other along the length of guide 105. These magnets may be evenly spaced, or may only appear in linear, or curved, portions of guide 105. In this manner, it is possible to minimize the friction between chain 125 and guide 105, minimizing the power necessary to drive chain 125. In an embodiment, magnets may be arranged along both linear portions of guide 105 where the tension of chain 125 is prone to decrease, which would allow lifting of conveyance element 130. In various embodiments, magnetic field generator may be located within or outside of path 110, or a combination thereof. Magnetic field generator 150 may also be located in or near any rail, such as first rail 145.

In general, the magnetic field generator generates a magnetic field capable of applying magnetic force to chain 125 and conveyance element 130 so that conveyance element 130 remains level with the guide. In various embodiments, conveyance element 130 may be flush with, parallel to, or level on top of a portion of guide 105, such as guide surface 107. Further, in various embodiments, conveyance element 130 may physically be in direct contact with guide 105. Conveyance element 130 may also in certain embodiments be in contact with guide 105 through the coupling means, such as chain 125. In the preferred embodiment at least a portion of conveyance element 130 remains parallel to a portion of guide 105, such as for example guide surface 107. In a typical embodiment, conveyance element 130 remains level as it is in motion. This motion may be linear or curved.

In an embodiment, the magnetic field generated by magnetic field generator 150 keeps chain 125 in contact with guide 105, preventing chain 125 from lifting as it travels around a curve. This in turn keeps conveyance element 130 in place. Moreover, should debris such as dirt penetrate beneath conveyance element 130 and between first rail 145 and second rail 155, these elements are all still attracted to chain 125, and conveyance element 130 will adhere to its proper position as it moves beyond the effected area.

In an embodiment, apparatus 100 may also include a second rail 155. Second rail 155 is generally analogous to first rail 145. Generally, second rail 155 runs in path 110 inside or adjacent to second guide edge 120. In an embodiment, second rail 155 may run the entire length of guide 105. In an embodiment, second rail 155 may run along the length of a segment of guide 105. In an illustrative embodiment, second rail 155 may only appear during a curved segment of guide 105. In a typical embodiment, second rail 155 is integrated with, or part of, second guide edge 140. Second rail 155 is depicted in FIG. 1 as having a round cross section, however in an embodiment, second rail 155 may also have a rectangular cross section, and in various embodiments, second rail 155 may have a cross section of any shape. In an embodiment, second rail 155 may be surrounded by guide 105, or located within guide 105 as part of second guide edge 120. In an embodiment, second rail 155 may support guide 105. Second rail 155 may include metals, polymers, or a blend thereof. In an embodiment, second rail 155 may be included within second guide edge 120. In other words, in an embodiment, second guide edge 120 may also be second rail 155. Typically, magnetic field generator 150 is capable of producing a magnetic field encompassing at least a portion of second rail 155. In an embodiment, the magnetic field applies a force to both second rail 155 and conveyance element 130 to hold conveyance element 130 in position relative to guide 105.

Apparatus 100 may also include a loading surface 160. In an embodiment, loading surface 160 is the surface of conveyance element 130 upon which an object, or a portion of an object may be placed. In another embodiment, loading surface 160 may be a separate surface located on conveyance element 130. The loading of an object may occur in real time as conveyance element 130 is in motion. Generally, loading surface 160 is capable of having an object or item, or portion thereof, placed upon it. Loading surface 160 may generally include metals, polymers, or any combination thereof. In an embodiment, loading surface 160 rests on at least a portion of first rail 145, second rail 155, or both. In an embodiment, loading surface 160 rests on, and is level with guide surface 107. In an embodiment, loading surface 160 may include one or more polymers, and loading surface 160 typically includes good wear resistance properties and a low coefficient of friction with respect to the material of guide 105.

Loading surface 160 may also include magnetic material, and when the lines of flux of the magnetic field generated by magnetic field generator 150 close through loading surface 160, then loading surface 160 and conveyance element 130 are attracted to first rail 145 (and perhaps second rail 155 if it is present), thus achieving optimum planarity and stability. In an embodiment the magnetic attraction is between first conveyance element edge 135 and first rail 145 on one side of guide 105, and between second conveyance element edge 140 and second rail 155 on the opposite side of guide 105. Further, in an embodiment, the lines of flux from magnetic field generator 150 also close through conveyance element 130 to attract it to chain 125, thus also achieving planarity on conveyance element 130 near the location where it is coupled to chain 125. Generally, conveyance element 130 is coupled to chain 125 roughly along the centerline of conveyance element 130.

Figure 2A:
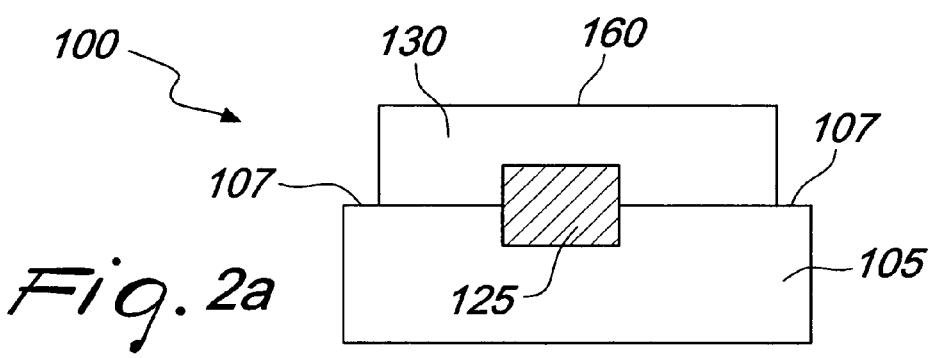
FIG. 2a is a cross sectional view of the apparatus capable of carrying out the method in accordance with an embodiment of the invention.
Figure 2B:
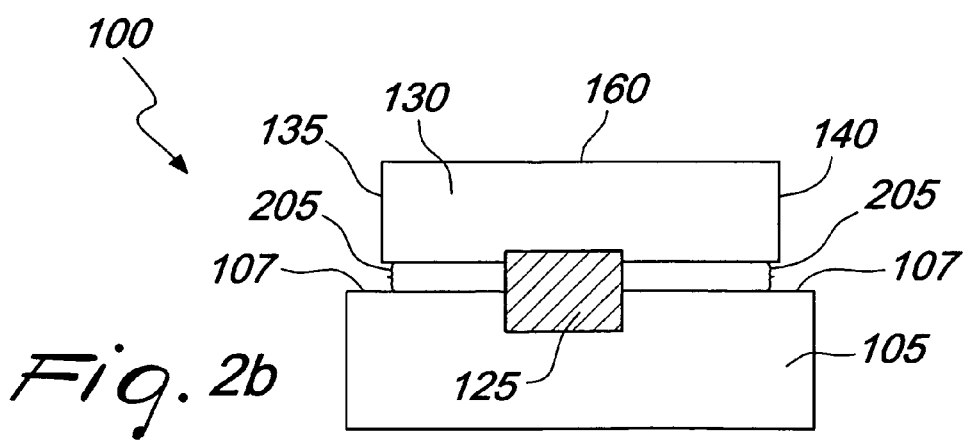
FIG. 2b is a cross sectional view of the apparatus capable of carrying out the method in accordance with an embodiment of the invention.

The above embodiments and others are also illustrated for exemplary purposes in FIGS. 2a and 2b. FIG. 2a is a block diagram of a cross section of a portion of apparatus 100 in accordance with an embodiment of the invention. Here it can be seen that chain 125, or other coupling means is linking conveyance element 130 to guide 105 where conveyance element 130 is flush along guide surface 107. In a typical embodiment, loading surface 160 is parallel to guide surface 107. In accordance with an embodiment of the invention, conveyance element 130, loading surface 160, guide 105, and guide surface 107 will remain in this position while conveyance element 130 is in motion. In an embodiment guide 105 may also be in motion.

FIG. 2b illustrates another embodiment of the invention. FIG. 2b depicts a cross section of a portion of apparatus 100 in accordance with an embodiment of the invention. In this illustrative embodiment, there is a gap 205 between conveyance element 130 and guide surface 107. In various embodiments, this gap may be an air gap, or other coupling means for coupling conveyance element 130 to guide 105, such as bushings, bearings, or pivots (not shown) may be present in gap 205. In accordance with an embodiment of the invention, gap 205 remains constant when any of conveyance element 130, chain 125, or guide 105 are in motion. In other words, gap 205 is of the same height in the region nearest a coupling element such as chain 125 as it is in the region near first conveyance element edge 135 or second conveyance element edge 140.

Figure 3:
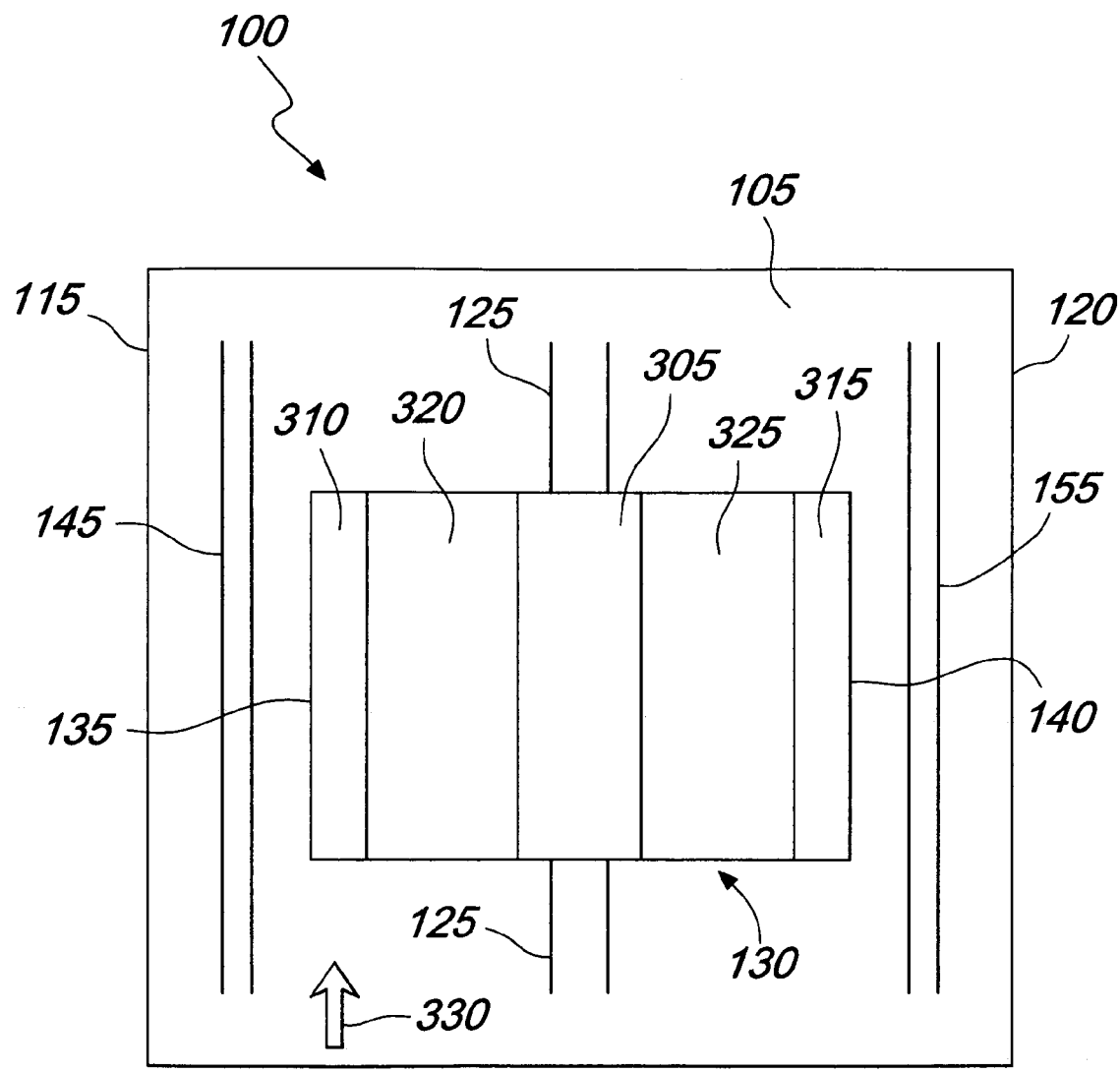
FIG. 3 is an overhead view of a portion of the apparatus capable of carrying out the method in accordance with an embodiment of the invention.

FIG. 3 is an overhead view of a portion of apparatus 100 in accordance with an embodiment of the invention. In this illustrative embodiment, conveyance element 130 is moving in the direction of motion indicated by arrow 330. In FIG. 3, chain 125 is coupling conveyance element 130 to guide 105. In an embodiment conveyance element 130 may be coupled to guide surface 107, not shown. In this illustrative embodiment, a first strip 305 of magnetic material runs the length of conveyance element 130 and is centered over chain 125, a second strip 310 of magnetic material runs along first conveyance element edge 135, a third strip 315 of magnetic material runs along second conveyance element edge 140, a fourth strip 320 of nonmagnetic material runs between first strip 305 and second strip 310, and a fifth strip 325 of nonmagnetic material 325 runs between first strip 305 and third strip 315. Generally, the magnetic material of first strip 305, second strip 310, and third strip 315 may include metals, or any mixture of metals and polymers that is sensitive to magnetic forces. Generally the nonmagnetic materials of fourth strip 320 and fifth strip 325 may include polymers, or any material that is not sensitive to magnetic forces. In an embodiment, any of strips 305, 310, 315, 320, or 325 may be an integral part of conveyance element 130. Alternatively, they may be removeably attached to conveyance element 130, or to loading surface 160. In an embodiment any of of the above-mentioned strips may include loading surface 160.

Figure 4:
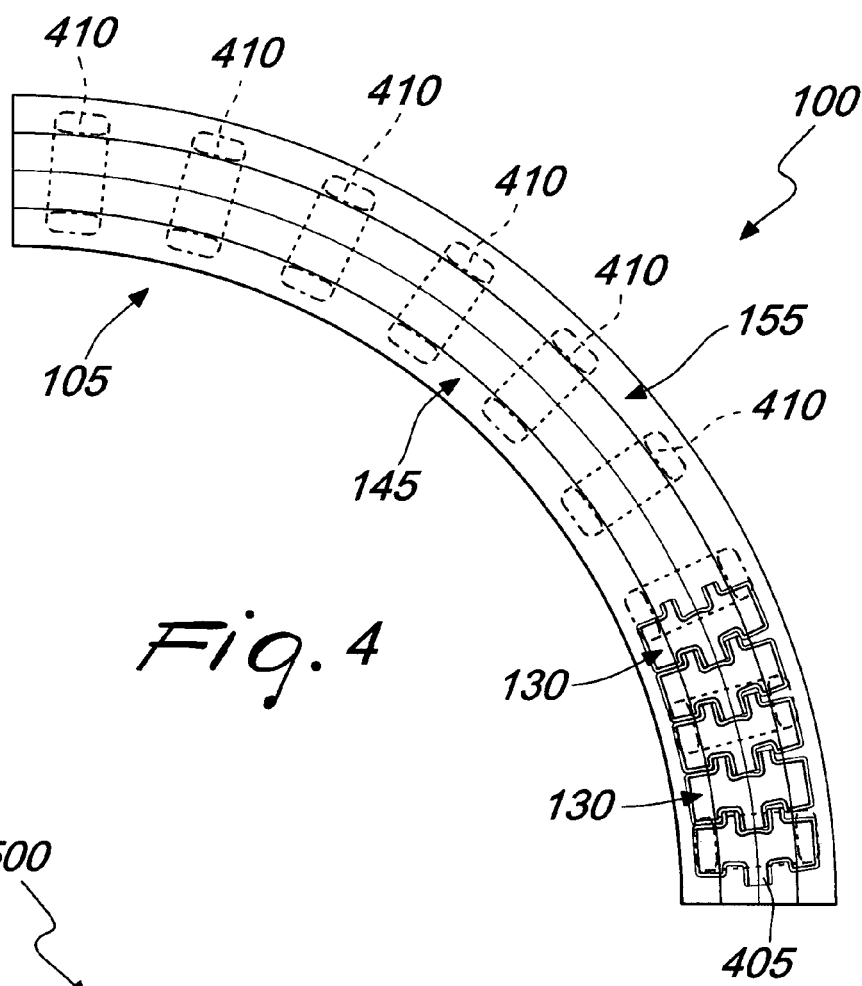
FIG. 4 is a top view of a curved portion of the apparatus capable of carrying out the method in accordance with an embodiment of the invention.

FIG. 4 is an overhead view of a curved portion of an embodiment of apparatus 100 in accordance with an embodiment of the invention. In this illustrative embodiment, guide 105 is rounding a corner, with a plurality of conveyance elements 130 traveling along guide 105, and first rail 145 and second rail 155 are visible at opposite ends of guide 105. A chain, not shown, couples the plurality of conveyance elements 130 to guide 105. In an embodiment, a pivot 405 exists between each conveyance element 130 to couple each conveyance element 130 to the immediately preceding of following conveyance element 130. Pivot 405 is any device, such as a connector, capable of attaching two conveyance elements together so that they run with each other along guide 105, and so that a plurality of conveyance elements 130 are capable of pivoting with respect to each other in order to round a corner. Generally, pivot 405 is made of magnetic material, but in various embodiments may be made of nonmagnetic polymers. FIG. 4 also illustrates an embodiment containing a plurality of magnets 410. Although in the illustrative embodiment, magnets 410 are indicated as being visible when seen from an overhead view, in an embodiment, the magnets may be placed beneath guide 105, (i.e., on the opposite side of guide 105 as conveyance element 130) and would not in such an embodiment be visible from an overhead view.)

Figure 5:
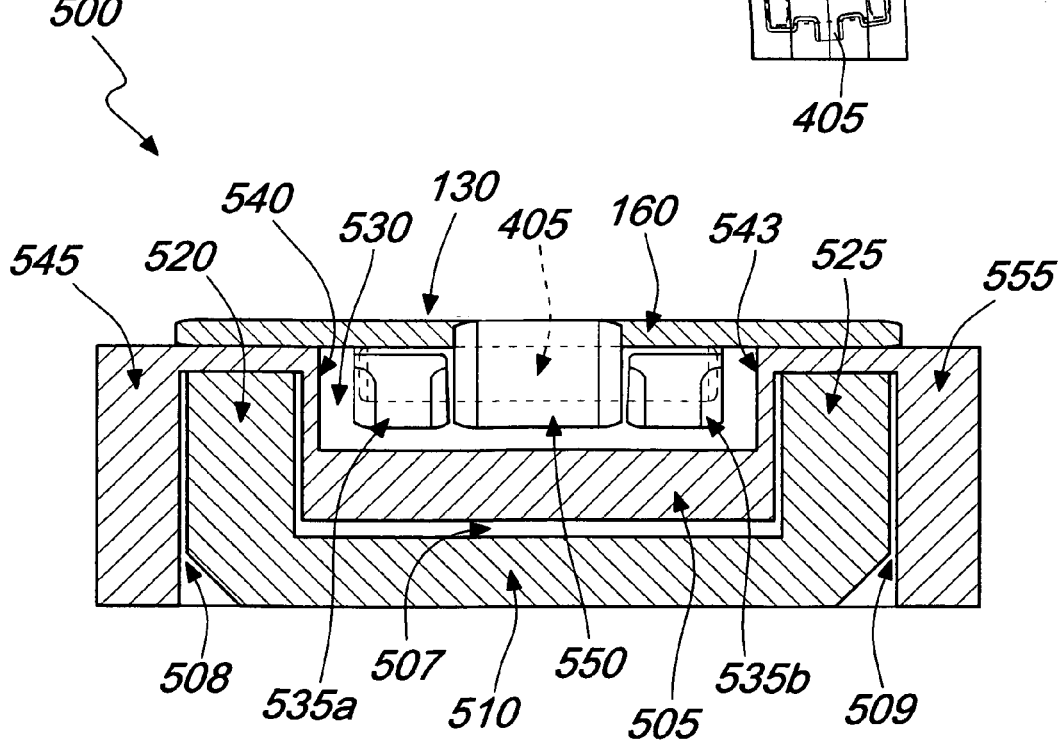
FIG. 5 is a cross sectional view of the apparatus capable of carrying out the method in accordance with an embodiment of the invention.

FIG. 5 is an alternate cross sectional view of an apparatus 500 in accordance with an embodiment of the invention. In this illustrative embodiment, guide 505 is shaped so that a first rail 545 includes a first guide edge 515 and so that a second rail 555 includes a second guide edge 520. In the embodiment illustrated by FIG. 5, conveyance element 130 rests on first rail 545 and on second rail 555, and magnet 510 applies attractive force holding conveyance element 130 flush against first rail 545 and second rail 555. Typically, this attractive force holds conveyance element 130 flat against guide 505 as conveyance element 130 is rounding a curve in, for example, a manufacturing line environment.

In various embodiments, magnet 510 may include a permanent magnet, or an electromagnet. Magnet 510 generally is placed in a receptacle 507. The receptacle is generally shaped to receive the magnet, where receptacle 507 generally includes a first receptacle end 508 and a second receptacle end 509. Typically, guide 505 and receptacle 507 combine to protect magnet 510 from debris or damage, and facilitates magnet 510 insertion and removal for maintenance. Magnet 510 may also include a first magnet wing 520 and a second magnet wing 525. Generally first magnet wing 520 and second magnet wing 525 have opposite magnetic polarities and both first magnet wing 520 and second magnet wing 525 typically protrude vertically from the base of magnet 510 in the same direction towards conveyance element 130. In an embodiment, first magnet wing 520 and second magnet wing 525 of magnet 510 fit within receptacle 507.

In an embodiment a seat 530 may be located between first rail 545 and second rail 555. The lateral ends of seat 530 are defined by a first side wall 540 and a second side wall 543. Generally, seat 530 includes a space between guide 505, conveyance element 130, first side wall 540, and second side wall 543 for at least one coupling means. This generally includes both a coupling means between conveyance element 130 and guide 505, as well as a coupling means between successive conveyance elements 130. Coupling means as used herein is generally defined as any structure including one or more physical devices capable of mechanically linking or joining together at least two elements. In an embodiment, located within seat 530, is at least one bushing. FIG. 5 illustrates two first bushings 535a and 535b, (collectively referred to as first bushings 535) however, various embodiments may include varying numbers of bushings. Generally, first bushings 535 are cylindrical, with the circular cross section running along guide 505. In various embodiments, first bushings 535 may be non-cylindrical in shape or oriented in a different direction. In an embodiment, first bushings 535 may include a hole or slot along its longitudinal axis, this axis being perpendicular to the longitudinal plane of guide 505.

Also located in seat 530 in an embodiment is at least one second bushing 550. Generally second bushing 550 protrudes beneath conveyance element 130. In an embodiment, second bushing 550 is located between first bushings 535a and 535b. Generally, second bushing 550 has a slot or hole along its longitudinal axis and is arranged so that the axis is perpendicular to the longitudinal plane of guide 505. Typically first bushings 535 and second bushing 550 include magnetic material such as metals or other ferromagnetic material, however in various embodiments first bushings 535 and second bushing 550 may include polymers, or a polymer-metal blend.

In an embodiment, also located in the area defined by seat 530 is pivot 405. Generally, pivot 405 is an object capable of coupling successive conveyance elements 130 to each other, and in some embodiments pivot 405 may assist in the coupling of conveyance element 130 and a chain. Pivot 405 typically includes ferromagnetic or other magnetic material. In an embodiment, pivot 405 is connected to first bushings 535a and second bushing 550 in order to drive a chain (not shown) to move conveyance element 130 in the direction of motion of the chain. Generally, pivot 405 may be partially inserted into at least one of first bushings 535 and in second bushing 550 to drive a chain. In an embodiment, the diameter of at least a portion of pivot 405 is larger than the diameter of the holes of first bushings 535 so that pivot 405 may be inserted into first bushings 535 with interference, and the diameter of pivot 405 is smaller than the diameter of the hole of second bushing 550 so as to allow relative rotation between successive conveyance elements 130 as conveyance elements 130 round a curve. In an embodiment, pivot 405 is located in the area defined by seat 530. In an embodiment, pivot 405 is located between first magnet wing 520 and second magnet wing 525 so that the the lines of flux from magnetic field generator, which may for example be magnet 510, close across pivot 405, thus maintaining planarity between conveyance element 130 and guide 505. In various embodiments, the lines of flux may close across at least any conveyance element, pivot, or loading surface 160.

Figure 6:
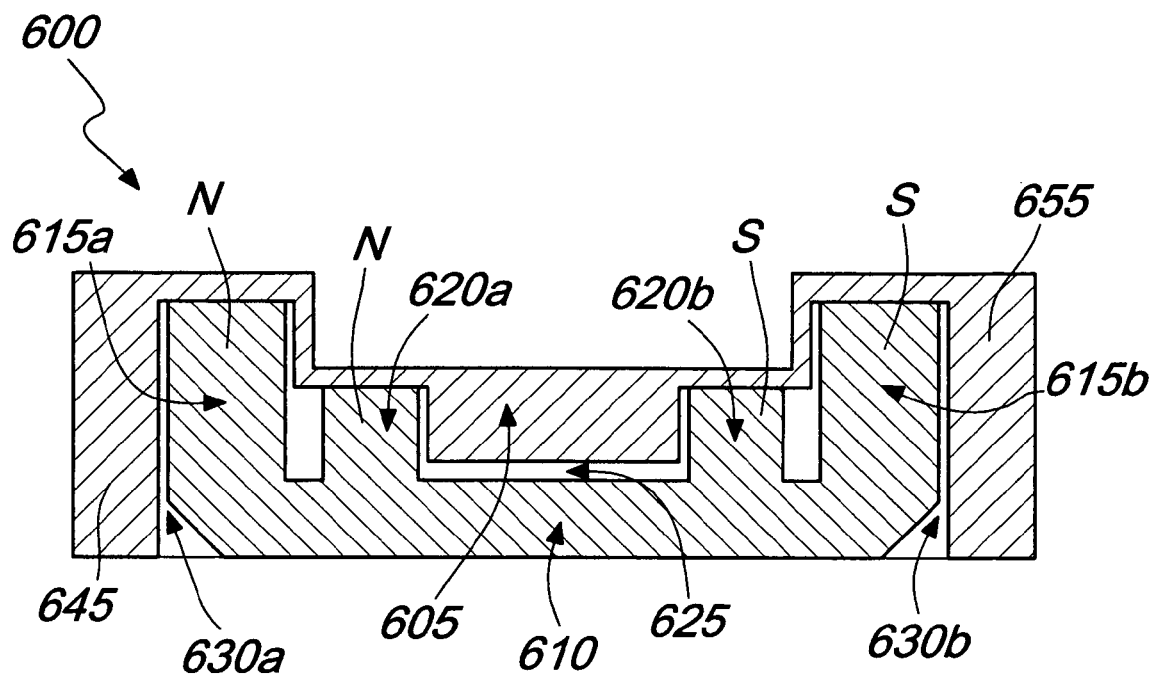
FIG. 6 is a cross sectional view of a portion the apparatus capable of carrying out the method in accordance with an embodiment of the invention.

FIG. 6 is a cross sectional view of an apparatus 600 in accordance with an embodiment of the invention. In this illustrative embodiment, a guide 605 includes at its lateral ends a first rail 645 and a second rail 655. Apparatus 600 also generally includes a magnet 610. In an embodiment, magnet 610, which may for example be a permanent magnet or an electromagnet, is located beneath guide 605. Magnet 610 also may include a pair of outer wings, 615a and 615b, (collectively 615), and a pair of inner wings 620a and 620b, (collectively 620). Generally, inner wings 620 are located between the pair of outer wings 615. Both outer wings 615 and inner wings 620 typically protrude in the same direction laterally from the base of the magnet. In an embodiment, inner wings 620 are smaller than outer wings 615, that is to say inner wings 620 to not extend as far from the base of magnet 610 as outer wings 615. In a typical embodiment, outer wing 615a and inner wing 620a are of the same polarity as each other, and that polarity is opposite to that of the polarity of both outer wing 615b and inner wing 620b. In the illustrative example of FIG. 6, both outer wing 615a and inner wing 620a are north poles of magnet 610, and both outer wing 615b and inner wing 620b are south poles, however the opposite polarities are also possible. Generally, the presence of outer wings 615 and inner wings 620 increases the magnetic force to hold a conveyance element tight against a guide. In an embodiment, apparatus 600 may also include a receptacle 625 including lateral ends 630a and 630b. Generally, receptacle 630 is shaped to fit between guide 605 and is formed to receive magnet 610.

Figure 7:
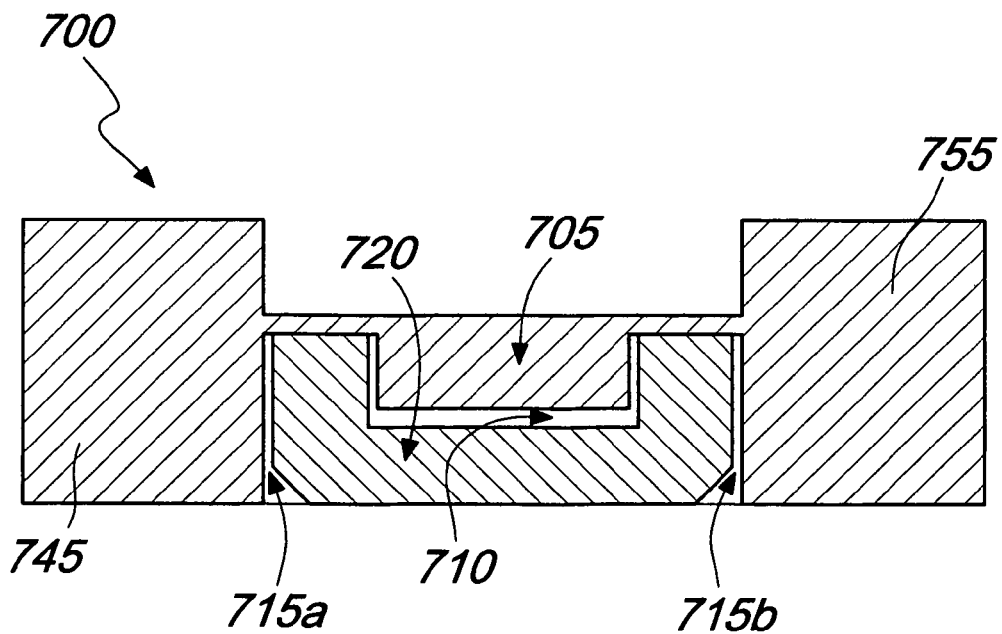
FIG. 7 is an alternate cross sectional view of a portion of the apparatus capable of carrying out the method in accordance with an embodiment of the invention.

FIG. 7 is a cross sectional view of an apparatus 700 in accordance with an embodiment of the invention. In this illustrative embodiment a guide 705 is shown, guide 705 including first rail 745 and second rail 755. Apparatus 700 also includes a receptacle 710. Generally, receptacle 710 includes two lateral ends 715a and 715b. Receptacle 710 is generally located beneath guide 705 and is capable of receiving a magnet 720 having an approximately a U-shaped cross section.

FIG. 8 is another cross sectional view of an embodiment of the invention. As can be seen various embodiments such as the illustrated apparatus 800 may include a plurality of guides, magnets, chains, rails, conveyance elements, and all other elements and features. For illustrative purposes, apparatus 800 includes at least one guide 805, and three magnets 850a, 850b, and 850c, (collectively 850). In various embodiments, there may be multiple guides that may or may not be coupled to each other. For example, multiple guides may run alongside each other to define a path. Further, various embodiments may include more or fewer magnets 850, and these magnets 850 may be, for example, permanent magnets or electromagnets. In this illustrative embodiment, apparatus 800 includes three sets of rails, a first rail set 845a and 845b (collectively 845), a second rail set 855a and 855b, (collectively 855) and a third rail set 865a and 865b, (collectively 865). In various embodiments, at least one conveyance element may be placed upon at least one of first rail set 845, second rail set 855, or third rail set 865. In the illustrated embodiment, at least one conveyance element 830 is placed upon guide 805 such that it is resting on and level with third rail set 865. In an embodiment, a second conveyance element (not shown) may be placed on either or both of first rail set 845 or second rail set 855. In various embodiments, there may be at least one conveyance element for each rail set. Generally, at least one of magnets 850 will hold at least one conveyance element 830 in place against at least one of first rail set 845, second rail set 855, or third rail set 865 as conveyance element 830 is in motion. Apparatus 800 also includes at least one chain 825 to couple at least one conveyance element 830 to guide 805 in any manner described previously.

From the foregoing, it will be appreciated that the systems and methods provided by the invention afford a simple and effective way to control a conveyance element while it is in motion. One skilled in the art will realize the invention may be embodied in other specific forms without departing from the spirit or essential characteristics thereof. The foregoing embodiments are therefore to be considered in all respects illustrative rather than limiting of the invention described herein. The scope of the invention is thus indicated by the appended claims, rather than by the foregoing description, and all changes that come within the meaning and range of equivalency of the claims are therefore intended to be embraced therein.

What is claimed is:

1. An apparatus for controlling at least one conveyance element in real time in an assembly line environment, comprising:
    a guide defining a path, the guide having a first guide edge and a second guide edge;
    a chain capable of moving in the path, the chain coupled to the guide;
    at least one conveyance element fixedly coupled to the chain, the at least one conveyance element located between the first guide edge and the second guide edge, each conveyance element having a first conveyance element edge on the same side of the guide as the first guide edge and a second conveyance element edge on the same side of the guide as the second guide edge;
    a first rail located a uniform distance from at least a portion of at least one first conveyance element edge; and
    a magnetic field generator capable of generating a magnetic field encompassing at least a portion of the apparatus, the magnetic field applying attractive force between;
    a) the chain and the at least one conveyance element to hold the at least one conveyance element level with the guide at the location nearest the chain; and
    b) the first rail and at least one first conveyance element edge to hold the at least one first conveyance element edge level with the guide.

2. The apparatus of claim 1, further comprising:
    a second rail located a uniform distance from at least a portion of at least one second conveyance element edge; and
    the magnetic field applying attractive force between;
    c) the second rail and at least one second conveyance element edge to hold the at least one second conveyance element edge level with the guide.

3. The apparatus of claim 2, wherein the at least one conveyance element further comprises:
    a first strip of magnetic material centered along the portion of the at least one conveyance element nearest the location of the chain;
    a second strip of magnetic material along the at least one first conveyance element edge;
    a third strip of magnetic material along the at least one second conveyance element edge;
    wherein the portion of the at least one conveyance element between the first strip and the second strip comprises a non-magnetic material; and
    wherein the portion of the at least one conveyance element between the second strip and the third strip comprises a non-magnetic material.

4. The apparatus of claim 1, wherein the at least one conveyance element includes a loading surface between the first conveyance element edge and the second conveyance element edge, the loading surface capable of supporting at least a portion of an item.

5. The apparatus of claim 4, wherein the coefficient of friction of the loading surface is less than the coefficient of friction of the guide.

6. The apparatus of claim 4, wherein the loading surface comprises a polymer.

7. The apparatus of claim 1, wherein the at least one conveyance element comprises a polymer-metal blend sensitive to the magnetic field.

8. The apparatus of claim 7, wherein the polymer-metal blend comprises 40–60% polymer, 20–40% iron oxide, and 10–30% non-iron oxide metal fiber.

9. The apparatus of claim 1, wherein the guide at least in part comprises a polymer having a coefficient of friction that is lower than the coefficient of friction of the chain.

10. The apparatus of claim 1, wherein the magnetic field generator includes at least one magnet having a base located in a receptacle in the guide, the magnet including at least two lateral extensions parallel to each other and perpendicular to the base of the magnet.

11. The apparatus of claim 1, wherein the chain comprises a polymer-metal blend sensitive to the magnetic field.

12. The apparatus of claim 1, wherein the at least one conveyance element comprises a conveyor belt.

13. A method for controlling at least one conveyance element in real time in an assembly line environment, comprising:
    defining a path along a guide having a first guide edge and a second guide edge;

coupling a chain to the guide, the chain capable of moving in the path;

fixedly coupling the chain to at least one conveyance element located between the first guide edge and the second guide edge, each conveyance element including a first conveyance element edge on the same side of the guide as the first guide edge and a second conveyance element edge on the same side of the guide as the second guide edge;

providing a first rail located a uniform distance from at least a portion of at least one first conveyance element edge; and generating a magnetic field encompassing at lent a portion of each of the chain, the at least one conveyance element, the at least one conveyance element edge, the guide, and the first rail, the magnetic field applying attractive force between;

a) the chain and the at least one conveyance element to hold the at least one conveyance element level with the guide at the location nearest the chain; and b) the first rail and the at least one first conveyance element edge to hold the at least one first conveyance element edge level with the guide.

14. The method of claim 13, further comprising:

providing a second rail located a uniform distance from at least a portion of at least one second conveyance element, to magnetic field encompassing at least a portion of the second rail, and the magnetic field applying attractive force between;

c) to second rail and at least one second conveyance element edge to hold the at least one second conveyance element edge level wit the guide.

15. The method of claim 13, wherein the at least one conveyance element further comprises:

including a first strip of magnetic material centered along the portion of the at least one conveyance element nearest the location of the chain;

including a second strip of magnetic material along the at least one first conveyance element edge;

including a third strip of magnetic material along the at least one second conveyance element edge;

including a fourth strip of non-magnetic material in the portion of the at least one conveyance element between the first strip and the second strip; and including a fifth strip of non-magnetic material in the portion of the at least one conveyance element between the second strip and the third strip.

16. The method of claim 13, wherein the at least one conveyance element further comprises:

loading at least a portion of an item onto a loading surface, the loading surface located between the first conveyance element edge and the second conveyance element edge.

17. The method of claim 16, wherein the loading surface comprises a polymer.

18. The method of claim 13, wherein the at least one conveyance element comprises a polymer-metal blend sensitive to the magnetic field.

19. The method of claim 13, wherein generating the magnetic field comprises a magnetic field generator including at least one magnet having a base located in a receptacle in the guide, the magnet including at least two lateral extensions parallel to each other and perpendicular to the base of the magnet.

* * * * *